US012737630B2

(12) United States Patent
Yajnanarayana et al.

(10) Patent No.: US 12,737,630 B2
(45) Date of Patent: Sep. 15, 2026

(54) FIRST NETWORK NODE AND METHOD PERFORMED THEREIN FOR HANDLING DATA IN A COMMUNICATION NETWORK

(71) Applicant: Telefonaktiebolaget LM Ericsson (publ), Stockholm (SE)

(72) Inventors: Vijaya Yajnanarayana, Bangalore (IN); Anusha Pradeep Mujumdar, Bangalore (IN); Swarup Kumar Mohalik, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 894 days.

(21) Appl. No.: 17/919,862

(22) PCT Filed: Apr. 20, 2020

(86) PCT No.: PCT/EP2020/061028

§ 371 (c)(1),
(2) Date: Oct. 19, 2022

(87) PCT Pub. No.: WO2021/213626

PCT Pub. Date: Oct. 28, 2021

(65) Prior Publication Data

US 2023/0188430 A1 Jun. 15, 2023

(51) Int. Cl.
*G06N 3/082* (2023.01)
*G06N 3/098* (2023.01)

(52) U.S. Cl.
CPC ............. *G06N 3/082* (2013.01); *G06N 3/098* (2023.01)

(58) Field of Classification Search
CPC .... G06N 3/082; G06N 3/098; H04L 41/0813; H04L 41/16
See application file for complete search history.

(56) References Cited

U.S. PATENT DOCUMENTS

2016/0050186 A1 2/2016 Liu et al.
2018/0032908 A1 2/2018 Nagaraju et al.
(Continued)

FOREIGN PATENT DOCUMENTS

CN 105075285 A 11/2015
CN 109754060 A 5/2019
(Continued)

OTHER PUBLICATIONS

Van Der Weide, T., Papadopoulos, D., Smirnov, O., Zielinski, M. and Van Kasteren, T., 2017, May. Versioning for end-to-end machine learning pipelines. In Proceedings of the 1st Workshop on Data Management for End-to-End Machine Learning (pp. 1-9). (Year: 2017).*

(Continued)

*Primary Examiner* — Kamran Afshar
*Assistant Examiner* — Majd Maher Haddad
(74) *Attorney, Agent, or Firm* — Roth well, Figg, Ernst & Manbeck, P.C.

(57) ABSTRACT

Embodiments herein relate to a method performed by a first network node (111) configured to operate in a communication network, wherein the first network node (111) is configured with a first machine learning, ML, model and being connected to a second network node (112) configured with a second ML model associated with the first ML model. The first network node obtains first data, from the second network node (112), associated with the second ML model; and upon a condition being fulfilled relating to the obtained first data, the first network node (111) keeps the first ML model as is, following a first evolution branch, and creates an updated version of the first ML model, following a second evolution branch, taking the obtained first data into account.

20 Claims, 7 Drawing Sheets

(56) References Cited

U.S. PATENT DOCUMENTS

| | | | | |
|---|---|---|---|---|
| 2019/0385092 | A1 | 12/2019 | Benke et al. | |
| 2020/0027033 | A1 | 1/2020 | Garg et al. | |
| 2020/0293887 | A1 * | 9/2020 | De Brouwer | G06N 3/09 |

FOREIGN PATENT DOCUMENTS

| | | | |
|---|---|---|---|
| CN | 110168580 | A | 8/2019 |
| CN | 110610093 | A | 12/2019 |
| CN | 110874484 | A | 3/2020 |
| RU | 2 702 980 | C1 | 10/2019 |

OTHER PUBLICATIONS

Tom van der Weide("Versioning for End-to-End Machine Learning Pipelines", 2017) (Year: 2017).*

Hinton ("Distilling the Knowledge in a Neural Network" 2015). (Year: 2015).*

International Search Report and Written Opinion issued in International Application No. PCT/EP2020/061028 dated Dec. 22, 2020 (12 pages).

Niknam, S. et al., "Federated Learning for Wireless Communications: Motivation, Opportunities and Challenges", arXiv:1908.06847v3 [eess.SP], Sep. 6, 2019 (6 pages).

Bagdasaryan, E., et al., "How to Backdoor Federated Learning," Aug. 2019 (15 pages).

* cited by examiner

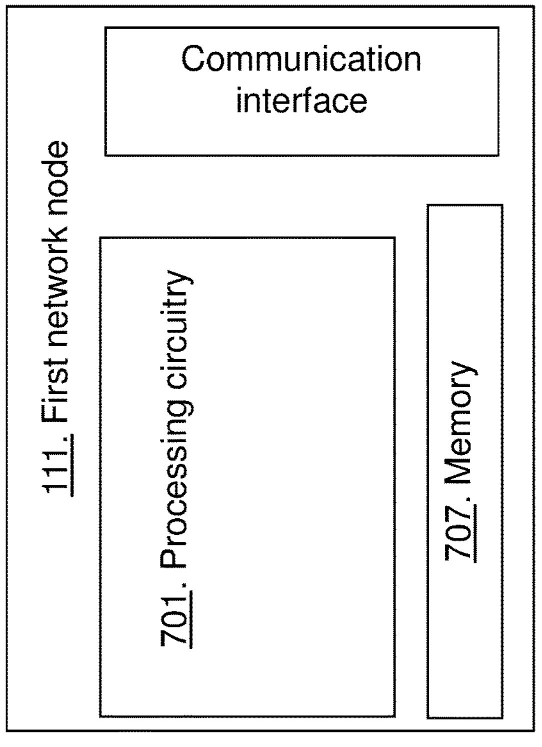
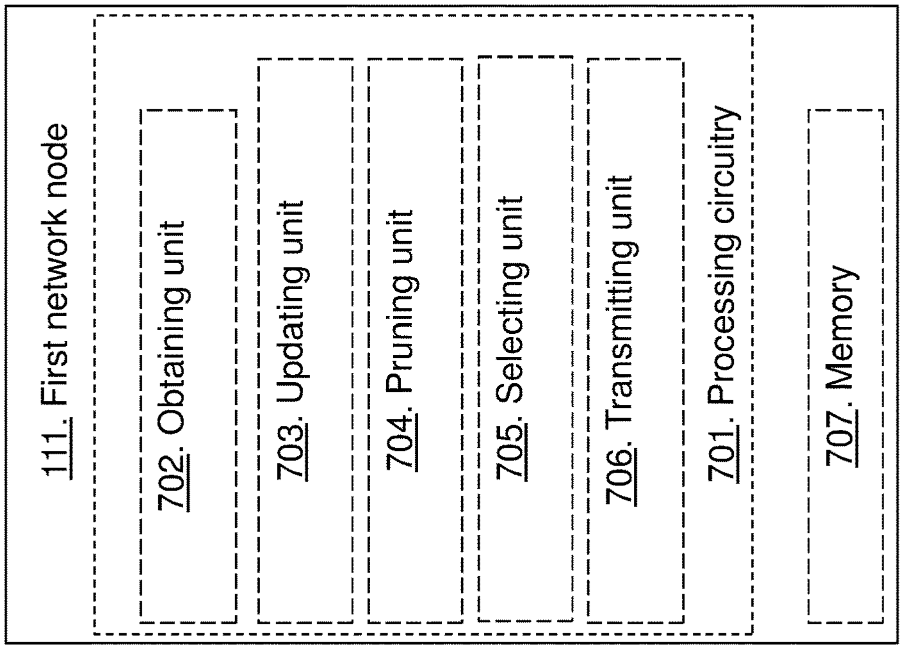
FIG. 7
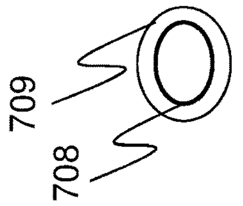

FIRST NETWORK NODE AND METHOD PERFORMED THEREIN FOR HANDLING DATA IN A COMMUNICATION NETWORK

CROSS REFERENCE TO RELATED APPLICATIONS

This application is a 35 U.S.C. § 371 National Stage of International Patent Application No. PCT/EP2020/061028, filed 2020 Apr. 20.

TECHNICAL FIELD

Embodiments herein relate to a first network node and a method performed therein for communication networks. Furthermore, a computer program product and a computer readable storage medium are also provided herein. In particular, embodiments herein relate to handling data, such as updating machine learning (ML) models, in a communication network.

BACKGROUND

In a typical communication network, wireless devices, also known as wireless communication devices, mobile stations, stations (STA) and/or user equipments (UE), communicate via e.g. access points to servers or to one another. To understand environment such as images, sounds etc. one may use different ways to detect certain events, objects or similar. A way of learning is using machine learning (ML) algorithms to improve accuracy.

Computational graph models are examples of ML models that are currently used in different applications and are based on different technologies. A computational graph model is a directed graph model where nodes correspond to operations or variables. Variables can feed their value into operations, and operations can feed their output into other operations. This way, every node in the graph model defines a function of the variables. Training of these computational graph models is typically an offline process, meaning that it usually happens in datacenters and takes several minutes to hours and days, depending on the underlying technology, the capabilities of the infrastructure used for training and the complexity of the computational graph model, e.g. amount of input data, parameters, etc. On the other hand, execution of these computational graph models is done anywhere from an edge of the communication network also called network edge, e.g. in devices, gateways or radio access infrastructure, to centralized clouds e.g. data centers.

In many cases, execution time is critical, i.e. time to obtain an output from the computational graph model, in particular for real-time applications, requiring low-latency feedback loops. A typical scenario is mobile devices in a wireless communication network requesting a decision from a centralized ML model execution environment, e.g. small devices that make use of object detection or augmented reality but have limited resources, e.g. glasses or other wearables, small robots like drones, etc.

Federated learning is a decentralized learning technique where an optimized global agent is built from decentralized local agents at multiple clients such as mobile phones, internet of things (IoT) devices, etc. This decentralized approach for learning has several advantages including ensuring privacy, localization of data and saving on connectivity costs. A typical structure of a federated learning framework is as shown in the FIG. 1. Thus, FIG. 1 shows a typical federated learning system, wherein a top node is the global model, which is trained from using client models such as UEs, IoT capable devices, etc. In the typical federated learning system, each local agent performs learning over its local data. The local agents may send their models (as weight vectors at each update cycle) to the central agent for updating the global model. These transfers may be denoted as model update transactions. Upon reception of these messages comprising the updated model from each local agent, the global model is revised taking the received client model into account (typically based on a weighted averaging scheme). In ML systems, the update messages to the central agent are sent at different times, and each update of the local model from each local agent will affect a change on the global model. Once the global model has reached close to convergence after several update rounds, the global model weights are transferred back to the multiple local agents as illustrated in the FIG. 1.

With each local agent (client) update, the global model evolves smoothly towards a better model for estimation and prediction. However, in this federated learning architecture, an incorrect client update can have catastrophic consequences, as it will be carried through for further evolution of the global model. It is herein suggested a method and apparatus to address this problem. It is shown in Bagdasaryan, Eugene, Andreas Veit, Yiqing Hua, Deborah Estrin, and Vitaly Shmatikov. "How to backdoor federated learning." arXiv preprint arXiv:1807.00459 (2018) https://arxiv.org/pdf/1807.00459.pdf that a single attack vector, sent in one model from one of the local agents during just one update cycle can cause the global model to be immediately poisoned, with up to 100% accuracy on the attack task. This can in turn rapidly poison the entire network of local agents, since the global model is poisoned.

SUMMARY

An object of embodiments herein is to provide a mechanism for improving operations of a communication network in an efficient manner.

According to an aspect the object is achieved by providing a method performed by a first network node configured to operate in a communication network, wherein the first network node is configured with a first ML model and being connected to a second network node configured with a second ML model associated with the first ML model. The first network node obtains first data, from the second network node, associated with the second ML model; and upon a condition being fulfilled relating to the obtained first data, the first network node keeps the first ML model as is, following a first evolution branch, and creates an updated version of the first ML model, following a second evolution branch, taking the obtained first data into account.

According to another aspect the object is achieved by providing a first network node configured to operate in a communication network, wherein the first network node is configured with a first ML model and being connected to a second network node configured with a second ML model associated with the first ML model. The first network node is configured to obtain first data, from the second network node, associated with the second ML model. The first network node is configured, upon a condition being fulfilled relating to the obtained first data, to keep the first ML model as is, following a first evolution branch, and to create an updated version of the first ML model, following a second evolution branch, taking the obtained first data into account.

It is furthermore provided herein a computer program product comprising instructions, which, when executed on at least one processor, cause the at least one processor to carry out any of the methods above, as performed by the first network node. It is additionally provided herein a computer-readable storage medium, having stored thereon a computer program product comprising instructions which, when executed on at least one processor, cause the at least one processor to carry out the method according to any of the methods above, as performed by the first network node.

Embodiments herein provide a decentralized learning that enables privacy and localization of data. The federated learning is one of the ways to achieve this where a global model also known as centralized or aggregated ML model, e.g. the first ML model, gets updated by exchanging local models, e.g. the second ML models, from multiple clients without exchanging sensitive user's data. However, an incorrect local model of a client update can have catastrophic consequences, as the incorrect local model will be carried through for further evolution of the global model. Embodiments herein disclose a method and apparatus to solve this problem. The ML model at the first network node may be duplicated and evolution of the first ML model is performed in a tree structure, i.e. along at least two branches upon one or more fulfilled conditions. The one or more conditions may indicate a set level of change in the model. Whenever there is a significant change in the received first data e.g. relative the first ML model present data, the first ML model may be bifurcated, and further updates may be carried on both the branches of the tree. Evolution branches herein meaning differently updated versions of the first ML model. Therefore, as several client updates arrive the first ML model is maintained in different versions in a tree with multiple branches. Reconciliation or selection as the first ML model may be performed periodically; the first network node may choose or construct e.g. a global ML model, utilizing the leaf-ML models of branches as candidate versions for federation.

Embodiments herein also concern the client side, i.e. a local network node, where the updates from the global network node and the new model derived from the newly observed local-data can be reconciled efficiently to ensure certain policies. For example, by keeping, at the local network node, the updates received from the global ML model and the local ML model derived from the newly observed data at the local network node, one can smoothly evolve the local ML model at the local network node, unlike the traditional architecture where the global ML model replaces the local ML model.

Embodiments herein may thus provide a robust federation against the ML model corruption during the transfer procedure of the federation process. Furthermore it is herein provided security against a malicious network node or agent posing as a local agent to poison the global ML model, and/or an improved performance of federated learning may be achieved. Thus, embodiments herein enable that operations of the communication network is improved in an efficient manner.

BRIEF DESCRIPTION OF THE DRAWINGS

Embodiments will now be described in more detail in relation to the enclosed drawings, in which:

FIG. 7 is a block diagram depicting embodiments of a first network node according to embodiments herein.

DETAILED DESCRIPTION

Figure 1:
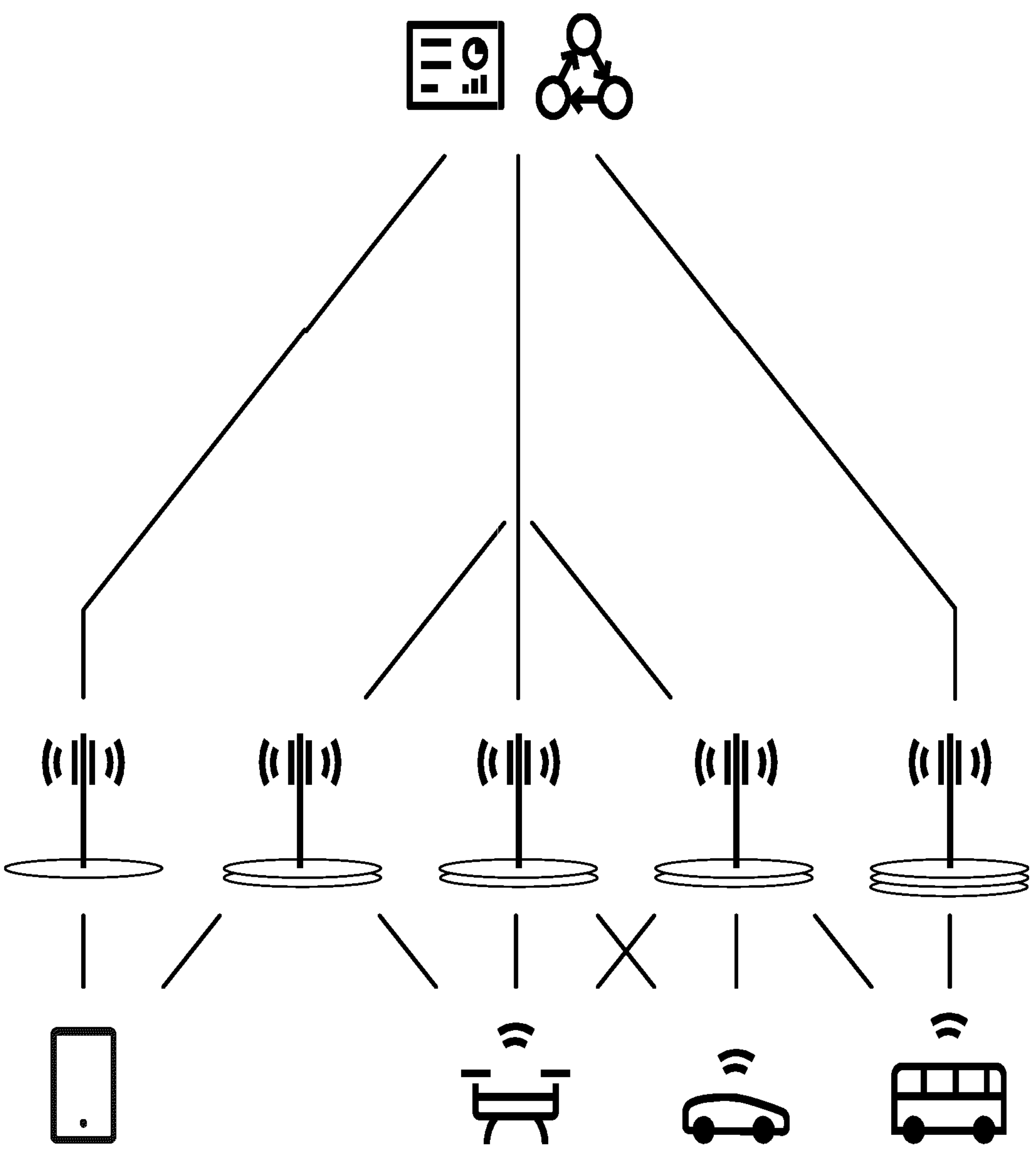
FIG. 1 shows a schematic overview depicting a federated learning framework
Figure 2:
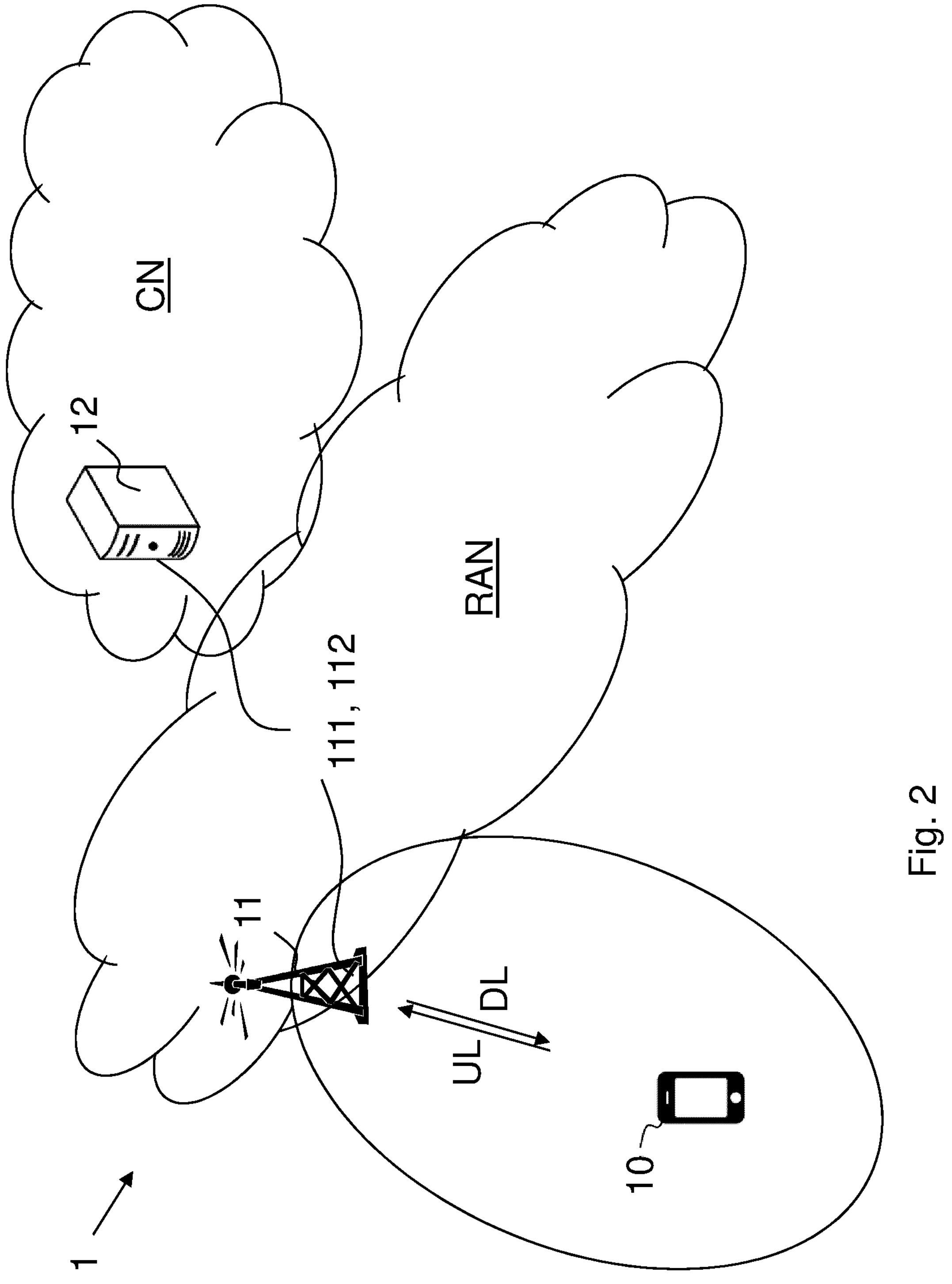
FIG. 2 is a schematic overview depicting a communication network according to embodiments herein.

Embodiments herein relate to communication networks in general. FIG. 2 is a schematic overview depicting a communication network 1. The communication network 1 may be any kind of communication network such as a wired communication network or a wireless communication network comprising e.g. a radio access network (RAN) and a core network (CN). The communication network may serve one or more requesting nodes 10 such as UEs, remote radio units, radio base stations, or similar. Embodiments herein relate to a local network node 11 for handling operations, such as providing responses, in the communication network 1. The local network node 11 may be a baseband unit, a radio network node such as a base station or an access node e.g. wireless local area network node, a user equipment, a gateway node, core network node, or another network node. The requesting nodes 10 are communicating with the local network node by transmitting data to the network nodes in uplink (UL) and receiving data in downlink (DL). The local network node 11 is configured to operate in the communication network e.g. between the one or more requesting nodes and a central network node 12, also referred to as a global network node, a cloud network node, an aggregating network node or similar. The central network node 12 may be a central cloud node, such as a centralized application server, a core network node, or similar comprising a global ML model also referred to as aggregated ML model, a global computational graph model, e.g. a deep learning model such as a neural network model. According to embodiments herein the local network node 11 is configured with a local ML model, wherein the local ML model is related to the global ML model, and wherein the local ML model may be a model requiring less computational resources to converge when compared to the global ML model. The local model may be trained locally based on received input data from the area served by the local network node 11. The methods according to embodiments herein are performed by a first network node 111 receiving data from a second network node 112, wherein the first network node 111 may be the central network node 12 or the local network node 11 and the second network node 112 may be the local network node or the central network node, respectively. The first network node 111 is configured with a first ML model, e.g. the global ML model or the local ML model, and the second network node 112 is configured with a second ML model associated with the first ML model, e.g. the local ML model or the global ML model. The first network node 111 e.g. receives first data, from the second network node 112, associated with the second ML model e.g. weights of the local ML model. Upon a condition being fulfilled relating to the obtained first data, a duplication process is performed wherein the first network node keeps the first ML model as is, following a first evolution branch, and creates an updated version of the first ML model, following a second evolution branch, taking the obtained first data into account.

The ML models mentioned herein cover a wide range of ML models such as computational graph models, including those trained using deep learning, e.g. artificial neural networks such as Convolutional Neural Networks, and may reduce execution latency without expensive hardware equipment in e.g. the local network node. The communication network 1 may be any packet-switched packet network and/or may be a communication network having wireless access to connected requesting nodes at the edge of the communication network 1, where the requesting node may request operations using computational graph model execution from the central network node 12 being a more centralized node.

Input to these ML models may comprise one or more values, e.g. numbers, alphanumerics and/or more complex data structures such as lists, arrays, etc. The output may be sent to the requesting node 10 that originated a "model execution" request.

In typical federated learning architectures, with each local ML model update that is updated data e.g. weights of the local ML model, the global ML model will evolve into a new ML model. Since the updates are incrementally applied to the global ML model, an incorrect update due to a malicious client can poison the global ML model. On the other hand, at the local network node 11, big changes in the global ML model due to updates from other client-models may override a local ML model with earlier weights reflecting local data. Hence, even global ML model updates need not be applied directly to the local ML model.

Embodiments herein disclose a scheme for resilient and robust federation in presence of e.g. malicious agents posing as local-agents to poison the global ML model, or genuine client's model getting corrupted during the transfer procedure of the federation process. In this scheme, the evolution of the global ML model and the local ML models are maintained in a version control system as updates from local ML models are applied to the global ML model and updates from global ML model are suggested to the local ML models. The first network node 111, upon a condition being fulfilled relating to obtained first data from the second network node, keeps the first ML model as is, following a first evolution branch, and creates an updated version of the first ML model, following a second evolution branch, taking the obtained first data into account. The condition may e.g. be fulfilled when obtained data differs above a threshold from previously received values. Thus, when poisonous data is received, it will be detected and that branch may be pruned at a later stage.

Figure 3:
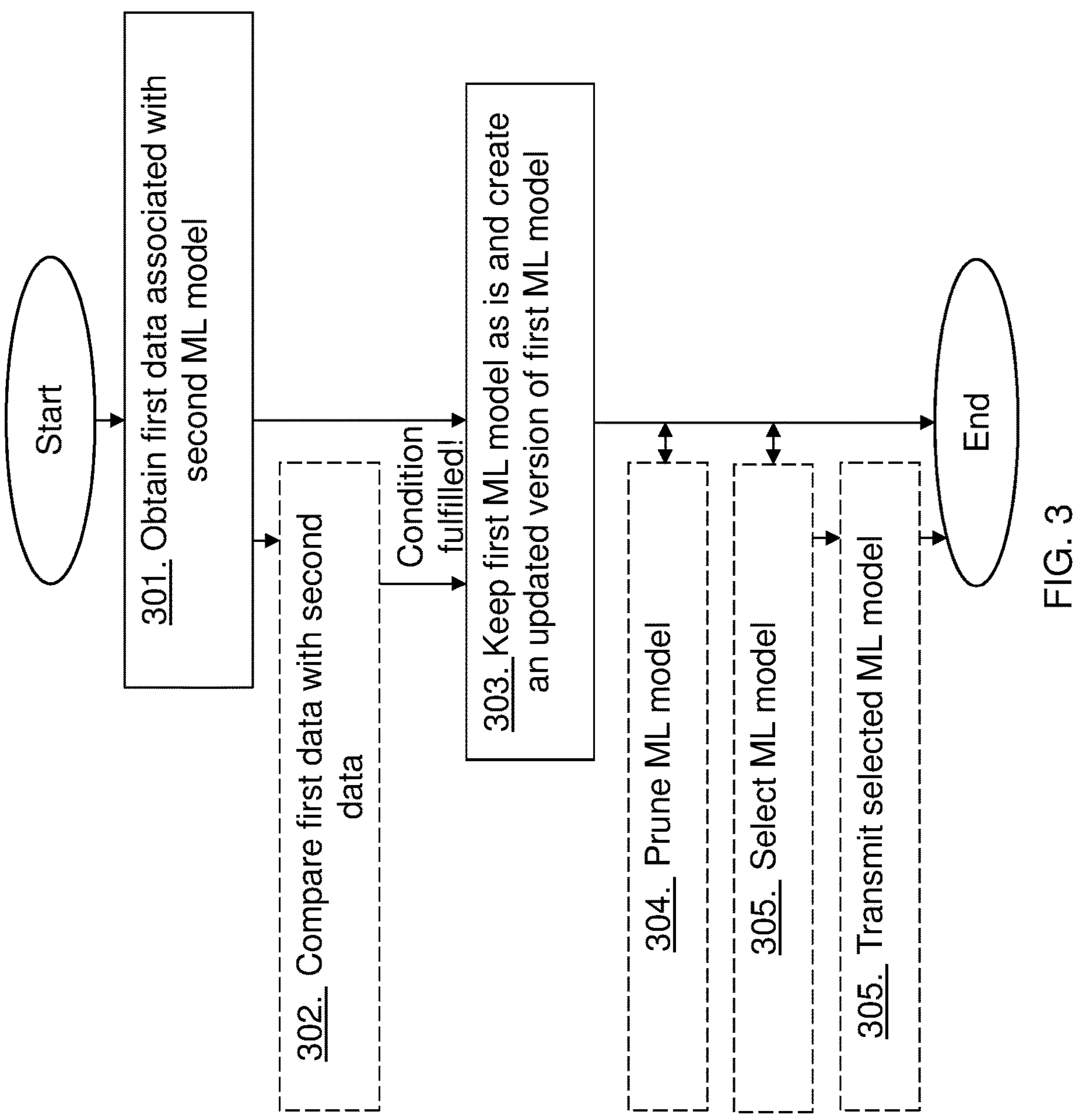
FIG. 3 is a flowchart depicting a method performed by a first network node according to embodiments herein.

The method actions performed by the first network node 111 in the communication network 1 according to embodiments will now be described with reference to a flowchart depicted in FIG. 3. The actions do not have to be taken in the order stated below, but may be taken in any suitable order. Actions performed in some embodiments are marked with dashed boxes. The first network node 111 is configured to operate in the communication network and the first network node 111 is configured with a first ML model and being connected to a second network node 112 configured with a second ML model associated with the first ML model, e.g. the first ML model may be a same or a similar version of the second ML model. The second network node may be a local network node and the first network node may be a central network node aggregating data associated with the first ML model from a plurality of local network nodes. The first network node may be a local network node and the second network node may be a central network node aggregating data associated with the second ML model from a plurality of local network nodes.

Action 301. The first network node 111 obtains first data, from the second network node, associated with the second ML model. The first data may comprise weight values for the second ML model.

Action 302. The first network node 111 may compare the first data with second data related to the first ML model and the condition is fulfilled when a difference between the first data and the second data is above or equals a threshold value.

Action 303. The first network node 111, upon a condition being fulfilled relating to the obtained first data, keeps the first ML model as is, following a first evolution branch, and creates an updated version of the first ML model, following a second evolution branch, taking the obtained first data into account.

Action 304. The first network node 111 may prune at least one ML model of an evolution branch upon a second condition being fulfilled. The second condition may comprise a first and/or a second parameter relating to the data of the at least one ML model. The first parameter may e.g. be fairness meaning a distribution denoting participation of the local network nodes in the updates. The more uniform is the participation; the better is the fairness metric. The second parameter may e.g. be Smoothness that denotes a rate of change in gradient for a specified history of updates. If there are sudden large changes, the smoothness of the branch is extremely low. The second condition may define that when a low second parameter and a low first parameter (low meaning lower than a threshold) occur that ML model is pruned.

Action 305. The first network node 111 may then select an ML model evolved along an evolution branch based on compared data values of different versions of the first ML model of different evolution branches. The data values of the different versions of the first ML model may be compared with a validation set.

Action 306. The first network node 111 may transmit the selected ML model to the second network node 112.

Figure 4:
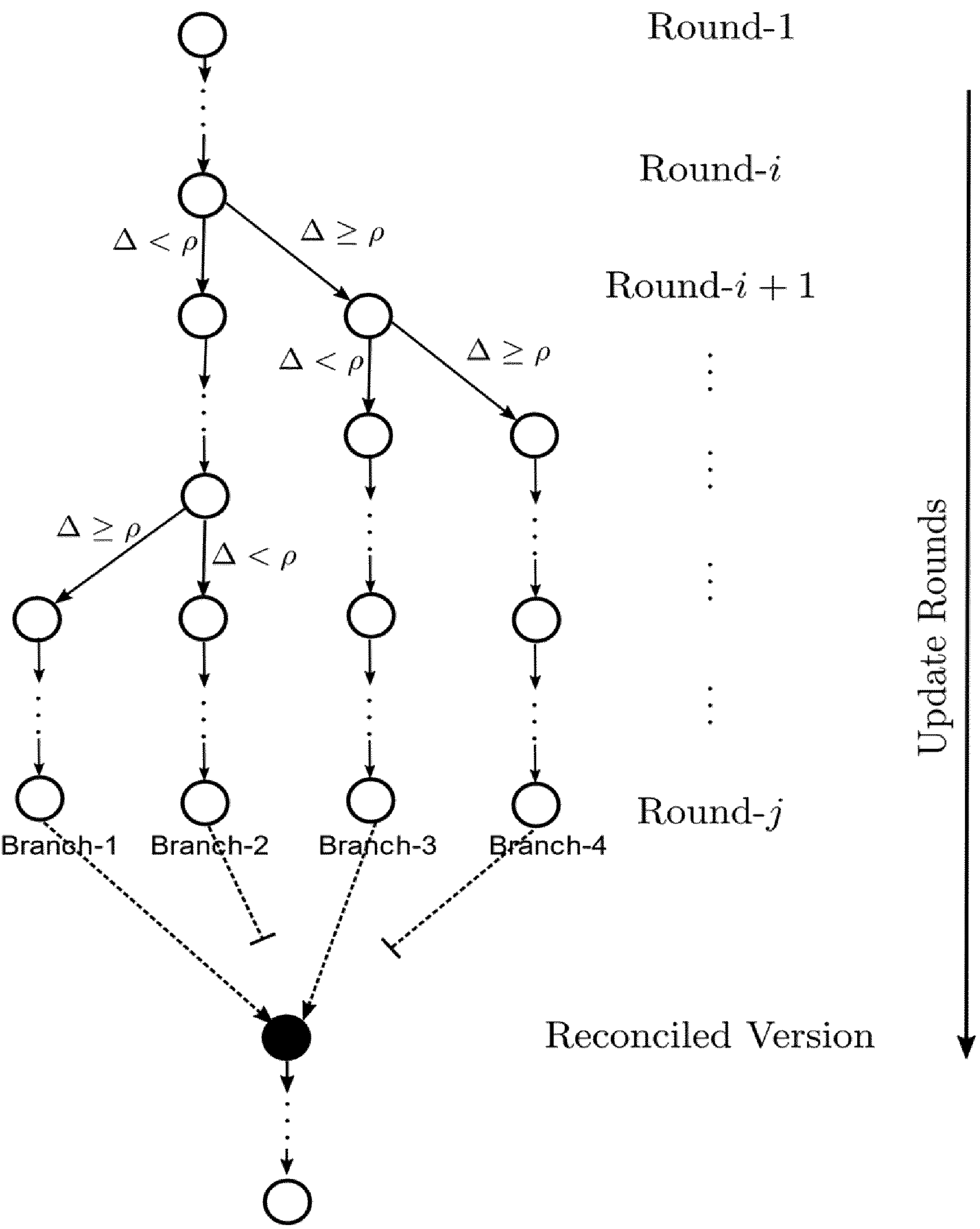
FIG. 4 is a schematic overview depicting a way of building a ML model according to embodiments herein.

The update scheme may therefore be represented in the form of a tree as shown in the FIG. 4.

FIG. 4 is an illustration of evolution of the global ML model during each update. Model updates are versioned and when the significant model update is predicted the versions are branched. Version trees for local ML models are contracted in a similar way.

An architecture is herein disclosed where the global ML model gets updated by multiple local network nodes. During each update round the global ML model evolves into a new model, and after N update rounds the global ML model can be transferred to new local network nodes and/or to all participating network nodes. It is herein disclosed an evolution of an ML model similar to a version control system and propose a strategy for resilient and robust federation through model-change identification and reconciliation. This is further illustrated in FIG. 4. Similar data structure and procedure may be applied to local ML models as well when global ML model updates happen. In the following, specifically, it is described how global (local) ML model updates are maintained in the version tree and how global (local) ML model versions are selected to be transmitted to local (resp. global) ML model.

The decentralized learning according to embodiments herein enables privacy and localization of data. The federated learning is one of the ways to achieve this where e.g. a global ML model gets updated by exchanging e.g. neural network models from multiple local network nodes without exchanging sensitive user's data. However, an incorrect client update can have catastrophic consequences, as it will be carried through for further evolution of the global model. To overcome this, the method according to embodiments herein is provided to persist the evolution of the ML model. The evolution of the model such that whenever there is a significant change in the ML model, being an example of the first condition, the evolution tree is bifurcated, and further updates are carried on both the branches of the tree. During a reconciliation stage, the suitable version is picked based on the performance of the candidate versions on a carefully designed strategy.

Thus: Version tree and update procedures for federated ML models based on "poison" criteria; Version tree pruning to reconcile models and reduce unwanted divergence; Version quality metrics, update procedures; and Federated model version selection (different embodiments based of quality metrics and validation sets).

Figure 5:
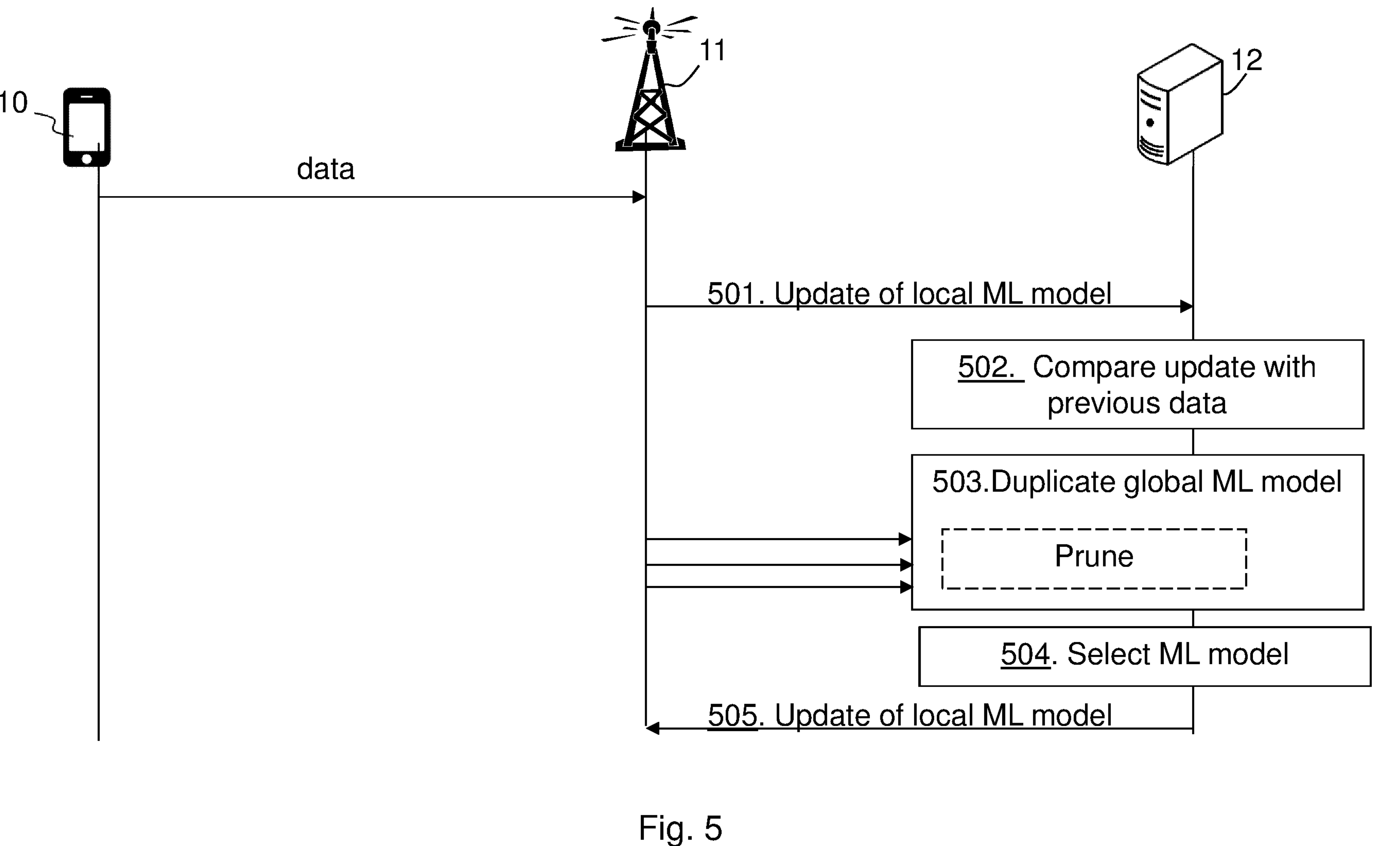
FIG. 5 is a combined flowchart and signalling scheme according to embodiments herein.

FIG. 5 shows the sequence flow, triggered from exchanging data from one or more requesting nodes.

Action 501. The local network node 11 transmits an update of the local ML model; e.g. weights of the local ML model, to the central network node 12. E.g. when local weights change above a threshold, i.e. difference is above a threshold or changed, or sent periodically.

Action 502. The global network node 12 checks whether the updated information such as the weights of the local ML model differ more than a threshold from previously reported values.

Action 503. That being the case, the global ML model is duplicated into two evolution branches, a first evolution branch comprising a first version wherein the global ML model is not updated, i.e. kept, and a second evolution branch comprising a second version taking the received update into account. The central network node may further prune ML models or branches based on parameters indicating quality of the ML model.

Action 504. The global network node 12 then selects global ML model along an update tree.

Action 505. The central network node 12 then sends this selected ML model to the local network node 11.

Regarding the Global ML Model tree:

A tree of models starting with the initial ML model with weights aggregated from the local ML models, i.e. a first ML model and updated versions are kept at each update fulfilling a certain condition.

Model Update—Global.

In each update round, all the ML models at the leaf nodes of the tree are examined for potential poisoning. Consider two sets of parameters representing the global model at the leaf and the i-client model (sent for update), these are represented by $$W^g = \{w_1^g, \ldots, w_N^g\} \text{ and } W_i^c = \{w_1^c, \ldots, w_N^c\} \text{ respectively.}$$

It si herein constructed a function which provides a heuristic on how different these models are. This is as shown in Equation (1)

$$\Delta = f(W^g, W_i^c) \tag{1}$$

The heuristic $\Delta$ is used to quantify the change in the ML model. In one example embodiment, this could be an $l_2$-distance between the ML model parameters as shown in Equation (2)

$$\Delta = \|W^g - W_i^c\|_2 \tag{2}$$

It is herein disclosed a strategy that whenever the value of $\Delta$ is greater than a threshold $\rho$, that is $\Delta > \rho$, then the change in the model is considered significant and hence there is a possibility that this could be an erroneous update. Global ML model evolution strategy is shown in the FIG. 4. Subsequently to this, all updates from the local network node will happen on both the threads as shown in FIG. 4.

Model Quality Metrics.

At each leaf ML model, certain parameters or metrics to characterize the quality of the corresponding branch are maintained. In an embodiment, the parameters may be <fairness, smoothness> where:

1. Fairness is a distribution denoting the participation of the local agents in the updates. The more uniform is the participation; the better is the fairness metric.
2. Smoothness denotes the (negative) rate of change in gradient (double derivative) for a specified (K) history of updates. This is designed so that if there are sudden large changes, the smoothness of the branch is extremely low.

Both the first and second parameters are updated at the time of update from the index (i) of the updating agent and the $\Delta$. User defined weights for the two parameters are used so that we can compare two tuples of parameters by the weighted average ($k_1$*fairness+$k_2$*smoothness).

Model Pruning (Action 304).

After each update, the model tree may be trimmed as follows.

1. If the quality parameters for a leaf is beyond certain pre-specified bounds, close the branch, and flag it for investigation.
2. If two leaf models have weights that are close to each other, close the one that has better quality. Quality herein meaning e.g. values of first and second parameters.

Model Selection (Action 305).

At regular intervals specified by the user, the system needs to propagate the global ML model to the local agents. At this point, 1. The system selects the leaf with the best quality and propagates
2. The system reinitializes the ML model tree
   a. In one embodiment, the system can reinitialize the ML model tree with the selected node as the root node.
   b. In another embodiment, the system retains only N branches, with the best quality, of depth d with a hypothetical root.
   c. In yet another embodiment, a custom validation set can be designed to pick the best version among all competing versions in the version tree. In standard ML applications, validation sets form part of the dataset which are not exposed during training and are used to assess the performance. Since the global ML model has in practice never seen any of the local agents' data, combining subsets of the local agents' data can form a candidate validation set $$[V = D_1^c, D_2^c, \ldots, D_N^c]$$

The selected model $$W_{i*}^{g}$$

is the one which has the least loss against the specially designed validation set, V.

This is further described in the Equation (3) and Equation (4)

$$i^* = \text{argmin}_i \mathcal{L}(W_i^g, V) \quad (3)$$

$$W^* = W_{i*}^{g} \quad (4)$$

Figure 6:
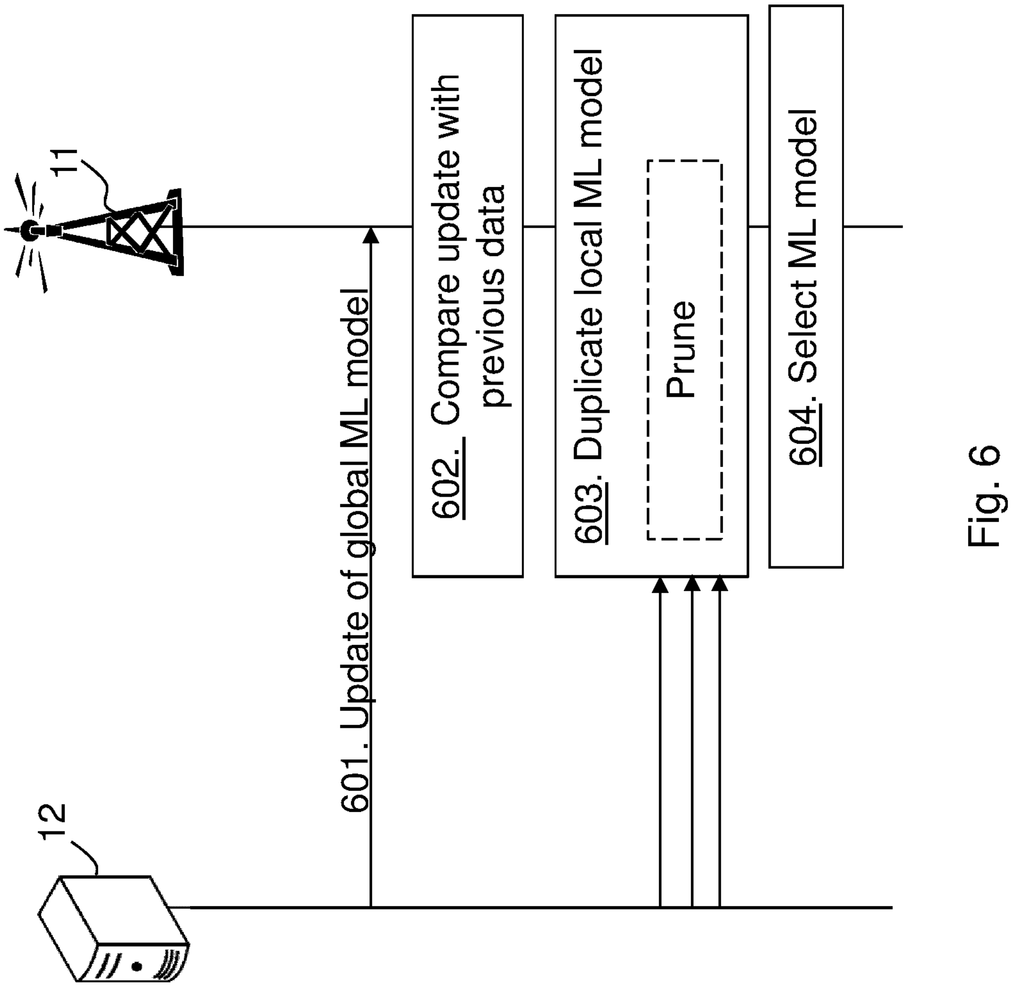
FIG. 6 is a combined flowchart and signalling scheme according to embodiments herein.

FIG. 6 shows the sequence flow, triggered from exchanging data from one or more local network nodes.

Action 601. The central network node 12 transmits an update of the global ML model; e.g. weights of the global ML model, to the local network node 11.

Action 602. The local network node 11 checks whether the global ML model information such as the weights of the global ML model differ more than a threshold from previously reported values or local ML model values.

Action 603. That being the case, the local ML model is duplicated into two evolution branches, a first evolution branch comprising a first version wherein the local ML model is not updated, i.e. kept, and a second evolution branch comprising a second version taking the received update into account. The local network node may further prune ML models or branches based on parameters indicating quality of the ML model.

Action 604. The global network node 12 then selects local ML model along an update tree to use.

Regarding updating local models:

ML Models Update—Local.

For each local node, the ML models are maintained in a version tree as in the global ML model, possibly with different thresholds for different nodes. The only updates here come from the global ML model and the local training.

Model Quality Metrics.

We have only the smoothness parameter herein since fairness does not make sense in this case. However, other parameters such as the distance from the current best ML model in the version tree (as in point 3) of model pruning in case of global model).

Model Pruning (Action 304).

Branches in the version tree are pruned similar to the global ML model.

Version Selection (Action 305).

In case of global ML model, the event at which decision to federate was at the update event (update from local models). In case of local ML models, since the only external updates are from the global ML model, different events are used to select a version and send to the global ML model. Note that the local ML models are also updated periodically through training on the local data.

1. The simplest alternative is to select the latest global version and prune the tree completely. This is done in the federated learning.
2. A better alternative is to select a local version that is the closest to the latest global ML model, take the average and set the new ML model as current.
3. Due to the availability of a history of global ML model updates at the client side, one could predict a future global ML model and construct a local version so that when the updates are finally transferred to the central network node it changes the global model marginally.

The selected ML model is sent to the global ML model and is marked as current in the version tree. This can be used to prune the version tree.

Note that in this way, the global ML model(s) are used only as guidance for updating the local ML model and do not override the local ML models.

FIG. 7 is a block diagram depicting the first network node in two embodiments configured to operate in the communication network 1, The first network node 111 is configured with the first ML model and being connected to the second network node 112 configured with the second ML model associated with the first ML model. This may be running somewhere in a cloud and the first network node 111 may comprise processing circuitry 701 e.g. one or more processors, configured to perform the methods herein. The second network node may be a local network node and the first network node may be a central network node aggregating data associated with the first ML model from a plurality of local network nodes. Alternatively, the first network node may be a local network node and the second network node may be a central network node aggregating data associated with the second ML model from a plurality of local network nodes.

The first network node 111 may comprise an obtaining unit 702, e.g. a receiver, transceiver or retrieving module. The first network node 111, the processing circuitry 701, and/or the obtaining unit 702 is configured to obtain first data, from the second network node, associated with the second ML model. The first data may comprise weight values for the second ML model.

The first network node 111 may comprise an updating unit 703. The first network node 111, the processing circuitry 701, and/or the updating unit 703 is configured to, upon a condition being fulfilled relating to the obtained first data, to keep the first ML model as is, following a first evolution branch, and to create an updated version of the first ML model, following a second evolution branch, taking the obtained first data into account. The first network node 111, the processing circuitry 701, and/or the updating unit 703 may be configured to compare the first data with second data related to the first ML model and the condition is fulfilled when the difference between the first data and the second data is above or equals a threshold value.

The first network node 111 may comprise a pruning unit 704. The first network node 111, the processing circuitry 701, and/or the pruning unit 704 may be configured to prune, i.e. remove, at least one ML model of an evolution branch upon a second condition being fulfilled. The second condition comprises a first and/or a second parameter relating to the data of the at least one ML model. E.g. when fairness is below a threshold or below other ML models first parameter, and/or when smoothness is above a threshold or below other ML models second parameter.

The first network node 111 may comprise a selecting unit 705. The first network node 111, the processing circuitry 701, and/or the selecting unit 705 may be configured to select an ML model evolved along an evolution branch based on compared data values of different versions of the first ML model of different evolution branches. The first network node 111, the processing circuitry 701, and/or the selecting unit 705 may be configured to compare the data values of the different versions of the first ML model with a validation set.

The first network node 111 may comprise a transmitting unit 706, e.g. a transmitter, transceiver or providing module. The first network node 111, the processing circuitry 701, and/or the transmitting unit 706 may be configured to transmit the selected ML model to the second network node 112. The computational graph model may be a neural network and/or a decision tree.

The first network node 111 further comprises a memory 707. The memory comprises one or more units to be used to store data on, such as models, input parameters, output parameters, conditions, data, processes to process the data, set of distributions, applications to perform the methods disclosed herein when being executed, and similar.

The methods according to the embodiments described herein for the first network node 111 are respectively implemented by means of e.g. a computer program product 708 or a computer program, comprising instructions, i.e., software code portions, which, when executed on at least one processor, cause the at least one processor to carry out the actions described herein, as performed by the first network node 111. The computer program 708 may be stored on a computer-readable storage medium 709, e.g. a universal serial bus (USB) stick, a disc or similar. The computer-readable storage medium 709, having stored thereon the computer program product, may comprise the instructions which, when executed on at least one processor, cause the at least one processor to carry out the actions described herein, as performed by the first network node 111. In some embodiments, the computer-readable storage medium may be a non-transitory computer-readable storage medium. The first network node 111 may comprise a communication interface comprising a transceiver, a receiver, a transmitter, and/or one or more antennas.

As will be readily understood by those familiar with communications design, that functions means, units, or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of an intermediate network node, for example.

Alternatively, several of the functional elements of the processing circuitry discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

In some embodiments a non-limiting term "UE" is used. The UE herein may be any type of UE capable of communicating with network node or another UE over radio signals. The UE may also be a radio communication device, target device, device to device (D2D) UE, machine type UE or UE capable of machine to machine communication (M2M), Internet of things (IoT) operable device, a sensor equipped with UE, iPad, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It may be any kind of network node which may comprise a server, radio network node such as a base station, a UE, a core network node, e.g., Network Operations Center (NOC) node, Mobility Managing Entity (MME), Operation and Maintenance (O&M) node, Self-Organizing Network (SON) node, a coordinating node, controlling node, Minimizing Drive Test (MDT) node, etc.), or an external node (e.g., 3$^{rd}$ party node, a node external to the current network), or even a radio network node such as base station, radio base station, base transceiver station, base station controller, network controller, evolved Node B (eNB), Node B, gNodeB, multi-RAT base station, Multi-cell/multicast Coordination Entity (MCE), relay node, access point, radio access point, Remote Radio Unit (RRU) Remote Radio Head (RRH), etc.

The term "radio node" used herein may be used to denote the wireless device or the radio network node.

The term "signalling" used herein may comprise any of: high-layer signalling, e.g., via Radio Resource Control (RRC), lower-layer signalling, e.g., via a physical control channel or a broadcast channel, or a combination thereof. The signalling may be implicit or explicit. The signalling may further be unicast, multicast or broadcast. The signalling may also be directly to another node or via a third node.

The embodiments described herein may apply to any RAT or their evolution, e.g., LTE Frequency Duplex Division (FDD), LTE Time Duplex Division (TDD), LTE with frame structure 3 or unlicensed operation, UTRA, GSM, WiFi, short-range communication RAT, narrow band RAT, RAT for 5G, etc.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first network node configured to operate in a communication network, wherein the first network node is configured with an initial version of a first machine learning (ML) model and is connected to a second network node configured with a second ML model associated with the first ML model, the method comprising:

obtaining from the second network node first data associated with the second ML model;

determining whether a condition relating to the obtained first data associated with the second ML model is fulfilled; and as a result of determining that the condition relating to the obtained first data associated with the second ML model is fulfilled:

i) creating a copy of the initial version of the first ML model;

ii) keeping both the initial version of the first ML model and the copy of the initial version of the first ML model; and iii) using the obtained first data associated with the second ML model, updating either the initial version of the first ML mode or the copy of the initial version of the first ML model thereby creating an updated version of the first ML model, while keeping the initial version of the first ML model or the copy of the initial version of the first ML model.

2. The method of claim 1, wherein the first data comprises weight values for the second ML model.

3. The method of claim 1, wherein the second network node is a local network node, and the first network node is a central network node aggregating data associated with the first ML model from a plurality of local network nodes.

4. The method of claim 1, wherein the first network node is a local network node, and the second network node is a central network node aggregating data associated with the second ML model from a plurality of local network nodes.

5. The method of claim 1, wherein the method further comprises determining a difference between the first data related to the second ML model and second data related to the first ML model, and determining whether the condition is fulfilled comprises determining whether the determined difference satisfies a threshold criterion.

6. The method of claim 1, wherein the method further comprises pruning at least one ML model of an evolution branch upon a second condition being fulfilled.

7. The method of claim 6, wherein the second condition comprises a first parameter relating to the data of the at least one ML model.

8. The method of claim 1, wherein the method further comprises selecting an ML model evolved along an evolution branch based on compared data values of different versions of the first ML model of different evolution branches.

9. The method of claim 8, wherein the data values of the different versions of the first ML model are compared with a validation set.

10. The method of claim 8, wherein the method further comprises transmitting the selected ML model to the second network node.

11. A non-transitory computer readable storage medium storing a computer program comprising instructions, which, when executed on at least one processor, cause the at least one processor to carry out the method of claim 1.

12. A first network node configured to operate in a communication network, wherein the first network node is configured with a first machine learning (ML) model and being connected to a second network node configured with a second ML model associated with the first ML model, wherein the first network node comprises:

memory; and processing circuitry, and the first network node is configured to perform a method comprising:

obtaining from the second network node first data associated with the second ML model;

determining whether a condition relating to the obtained first data associated with the second ML model is fulfilled; and as a result of determining that the condition relating to the obtained first data associated with the second ML model is fulfilled:

i) creating a copy of the initial version of the first ML model;

ii) keeping both the initial version of the first ML model and the copy of the initial version of the first ML model; and iii) using the obtained first data associated with the second ML model, updating either the initial version of the first ML mode or the copy of the initial version of the first ML model thereby creating an updated version of the first ML model, while keeping the initial version of the first ML model or the copy of the initial version of the first ML model.

13. The first network node of claim 12, wherein the first data comprises weight values for the second ML model.

14. The first network node of claim 12, wherein the second network node is a local network node, and the first network node is a central network node aggregating data associated with the first ML model from a plurality of local network nodes.

15. The first network node of claim 12, wherein the first network node is a local network node, and the second network node is a central network node aggregating data associated with the second ML model from a plurality of local network nodes.

16. The first network node of claim 12, wherein the method further comprises comparing the first data with second data related to the first ML model and the condition is fulfilled when a difference between the first data and the second data is above or equals a threshold value.

17. The first network node of claim 12, wherein the method further comprises pruning at least one ML model of an evolution branch upon a second condition being fulfilled.

18. The first network node of claim 17, wherein the second condition comprises a first parameter relating to the data of the at least one ML model.

19. The first network node of claim 12, wherein the method further comprises selecting an ML model evolved along an evolution branch based on compared data values of different versions of the first ML model of different evolution branches.

20. The first network node of claim 19, wherein the first network node is configured to compare the data values of the different versions of the first ML model with a validation set.

* * * * *